United States Patent [19]

Harris

[11] Patent Number: 5,048,220
[45] Date of Patent: Sep. 17, 1991

[54] ICE FISHING TRAP

[76] Inventor: Dennis L. Harris, 2722 E. 11th St., Cheyenne, Wyo. 82001

[21] Appl. No.: 585,016

[22] Filed: Sep. 18, 1990

[51] Int. Cl.⁵ .............................................. A01K 61/00
[52] U.S. Cl. .................................................. 43/4; 43/1; 43/55
[58] Field of Search .......................... 43/4, 5, 55, 1, 105

[56] References Cited

U.S. PATENT DOCUMENTS

| 1,486,390 | 3/1924 | Pedersen | 43/105 |
| 2,877,595 | 3/1959 | Steuart | 43/1 |
| 2,935,811 | 5/1960 | Hurtig | 43/105 |
| 3,134,186 | 5/1964 | Krueger | 43/4 |
| 4,637,155 | 1/1987 | Johnson | 43/55 |
| 4,794,718 | 1/1989 | Tillman | 43/17 |
| 4,852,295 | 8/1989 | Sandlofer | 43/104 |
| 4,866,875 | 9/1989 | Guilbault et al. | 43/4 |

Primary Examiner—Kurt Rowan
Assistant Examiner—Chuck Y. Mah
Attorney, Agent, or Firm—Leon Gilden

[57] ABSTRACT

An apparatus including an elongate extensible and collapsible cylindrical housing, with a rigid annular ring mounted at an upper end of the housing and a rigid cylinder mounted at a lower end of the housing, with a ring including a plurality of handles, with the handles diametrically aligned relative to one another, including aligned recesses to position a fishing rod therewithin. The lower cylindrical housing includes a trap door positioned within the lower end of the housing to permit closing of the door upon directing of a fish therethrough and collapsing of the door subsequent to securing the fish within the elongate cylindrical housing.

6 Claims, 4 Drawing Sheets

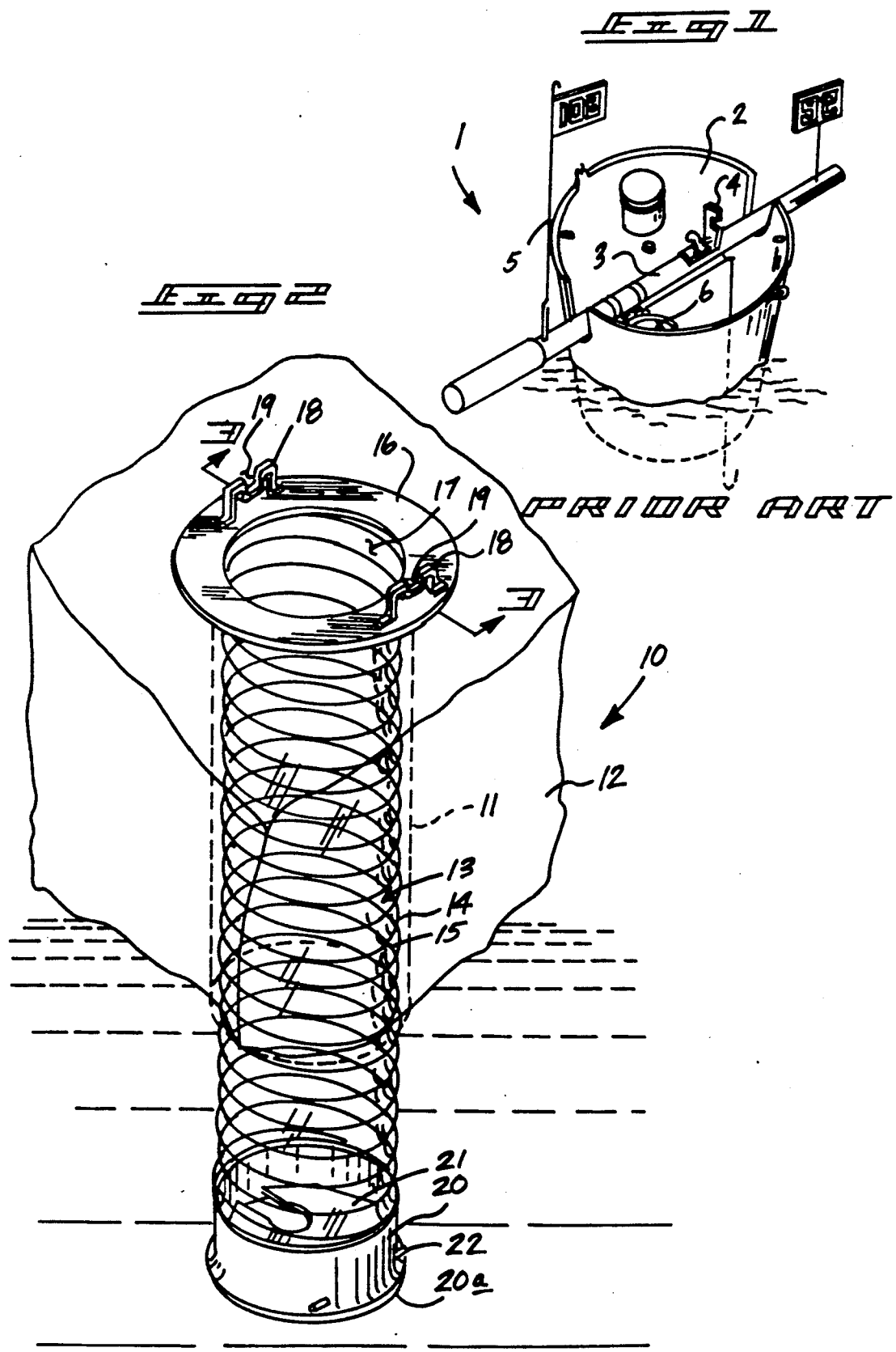

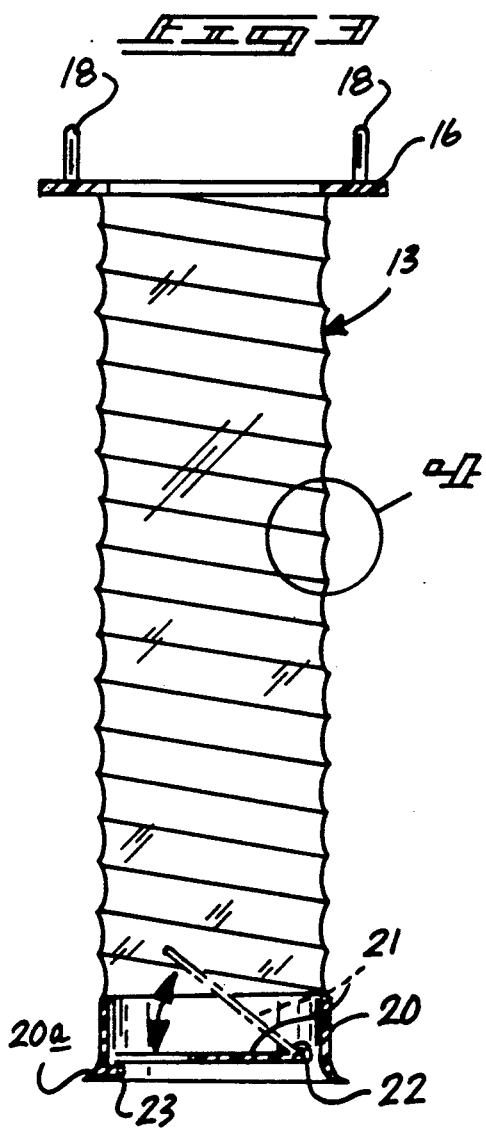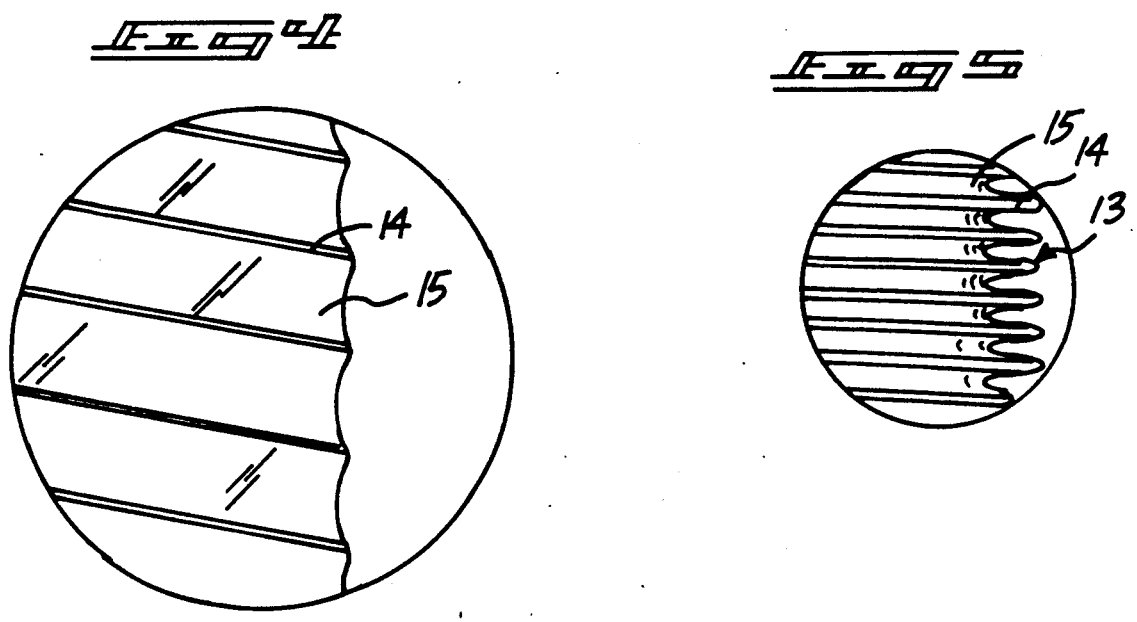

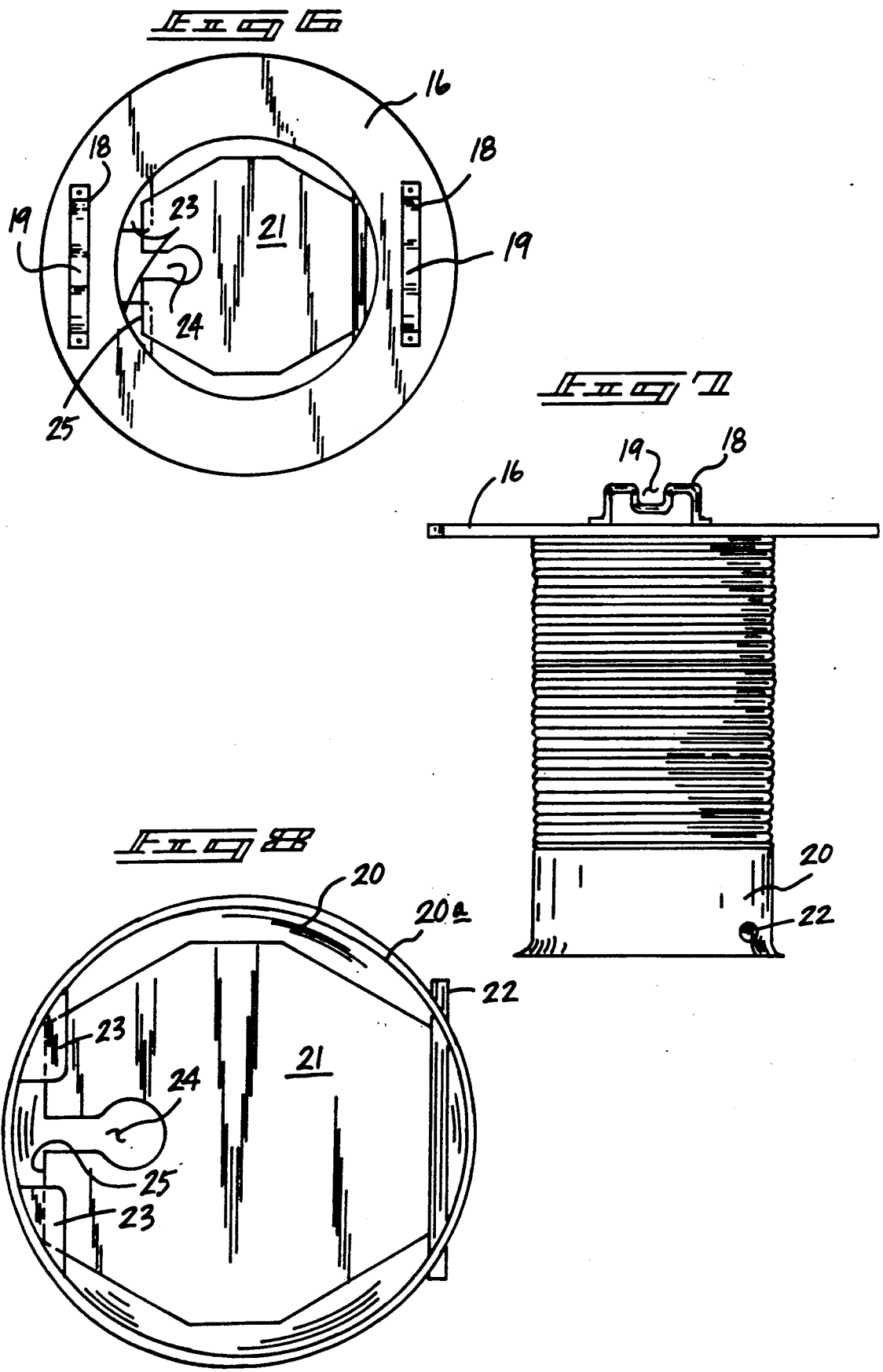

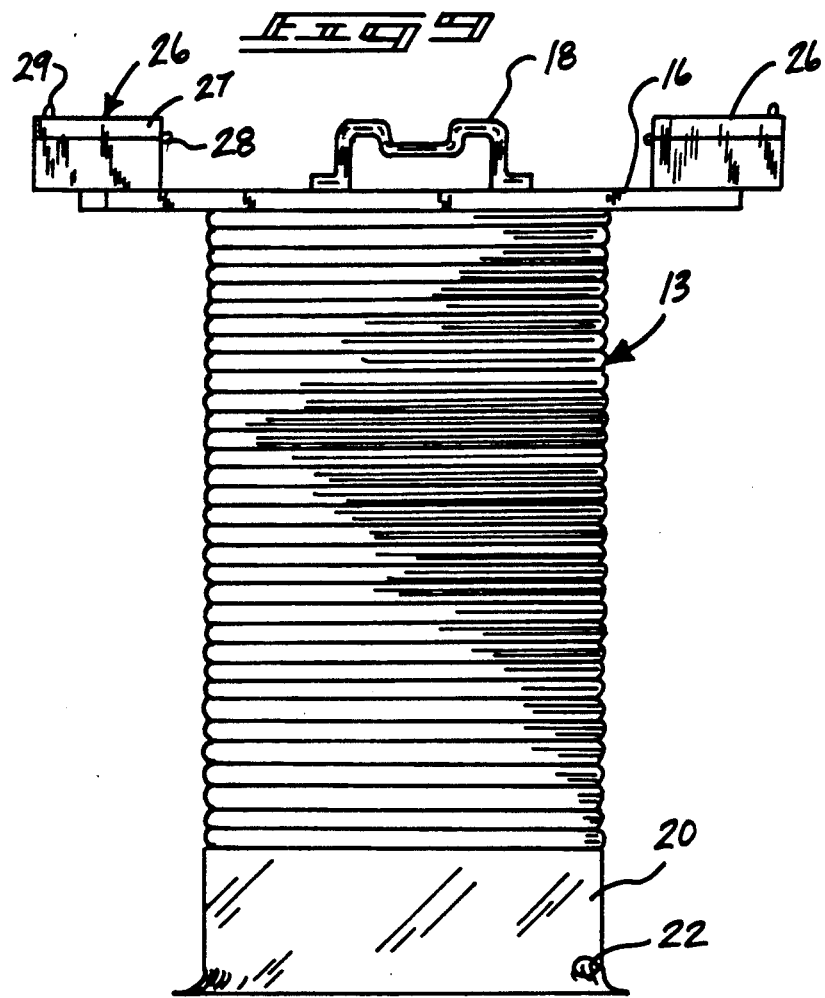
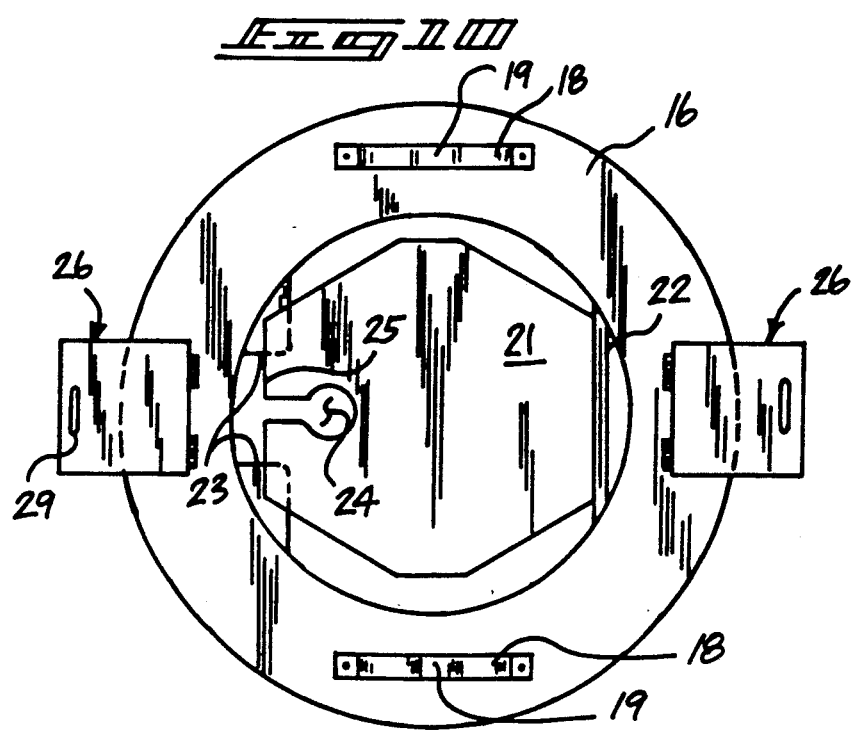

1

ICE FISHING TRAP

BACKGROUND OF THE INVENTION

1. Field of the Invention

The field of invention relates to ice fishing apparatus, and more particularly pertains to a new and improved ice fishing captor wherein the same permits securement and enclosing of a fish within an elongate housing upon directing of a fish therewithin.

2. Description of the Prior Art

In an ice fishing event, fish are frequently lost due to the fraying and cutting of the fishing line resulting in the loss of fish, as well as the snagging of various components of fishing equipment about an ice fishing opening within a sheet of ice. Prior art ice fishing apparatus has not attended this problem in a manner as set forth by the instant invention to secure fish within an elongate housing positioned within an ice sheet. Examples of the prior art include U.S. Pat. No. 4,662,099 to Stewart proves a tip-up system for ice fishing incorporating a heated housing for preventing ice fishing freeze over within the hole of a sheet of ice.

U.S. Pat. No. 4,845,878 to Hackel sets forth a further tip-up ice fishing organization utilizing a rod and reel member mounted within a housing to overlie an ice fishing hole.

U.S. Pat. No. 3,578,748 to Hurd provides a buoyant cover for an ice fishing hole formed with a central split secured by a grease-like substance to permit maintaining of the ice fishing hole and preventing freeze up of the hole during use.

U.S. Pat. No. 3,694,950 to Maier sets forth an ice fishing accessory wherein a framework is mounted overlying an ice fishing hole, with a cover slidably positioned to overlie the framework and associated ice fishing hole to prevent a fish member from falling back through the hole.

As such, it may be appreciated that there continues to be a need for a new and improved ice fishing captor which addresses both the problems of ease of use as well as effectiveness in construction and in this respect, the present invention substantially fulfills this need.

SUMMARY OF THE INVENTION

In view of the foregoing disadvantages inherent in the known types of ice fishing apparatus now present in the prior art, the present invention provides an ice fishing captor wherein the same provides a trap door mounted at a lower terminal end of an elongate housing to secure and maintain fish within the housing directed therewithin in an ice fishing event. As such, the general purpose of the present invention, which will be described subsequently in greater detail, is to provide a new and improved ice fishing captor which has all the advantages of the prior art ice fishing apparatus and none of the disadvantages.

To attain this, the present invention provides an apparatus including an elongate extensible and collapsible cylindrical housing, with a rigid annular ring mounted at an upper end of the housing and a rigid cylinder mounted at a lower end of the housing, with a ring including a plurality of handles, with the handles diametrically aligned relative to one another, including aligned recesses to position a fishing rod therewithin. The lower cylindrical housing includes a trap door positioned within the lower end of the housing to permit closing of the door upon directing of a fish therethrough and collapsing of the door subsequent to securing the fish within the elongate cylindrical housing. The trap door is transparent so fish can be seen when they approach the ice hole.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ice fishing captor which has all the advantages of the prior art ice fishing apparatus and none of the disadvantages.

It is another object of the present invention to provide a new and improved ice fishing captor which may be easily and efficiently manufactured and marketed.

It is a further object of the present invention to provide a new and improved ice fishing captor which is of a durable and reliable construction.

An even further object of the present invention is to provide a new and improved ice fishing captor which is susceptible of a low cost of manufacture with regard to both materials and labor, and which accordingly is then susceptible of low prices of sale to the consuming public, thereby making such ice fishing captors economically available to the buying public.

Still yet another object of the present invention is to provide a new and improved ice fishing captor which provides in the apparatuses and methods of the prior art some of the advantages thereof, while simultaneously overcoming some of the disadvantages normally associated therewith.

Still another object of the present invention is to provide a new and improved ice fishing captor wherein the same provides securement of a fish directed within the captor during use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art ice fishing apparatus.

FIG. 2 is an isometric illustration of the instant invention.

FIG. 3 is an orthographic side view, taken in elevation, of the instant invention.

FIG. 4 is a detailed illustration of the elongate cylindrical body utilized by the instant invention in an extended configuration.

FIG. 5 is a detailed illustration of the elongate extensible body in a depressed configuration.

FIG. 6 is an orthographic top view of the instant invention.

FIG. 7 is an orthographic side view, taken in elevation, of the instant invention in a compressed configuration.

FIG. 8 is an orthographic bottom view the instant invention.

FIG. 9 is an orthographic side view, taken in elevation, of the instant invention utilizing a plurality of container members mounted thereon.

FIG. 10 is an orthographic top view of the instant invention as illustrated in FIG. 9.

DESCRIPTION OF THE PREFERRED EMBODIMENT

With reference now to the drawings, and in particular to FIGS. 1 to 10 thereof, a new and improved ice fishing captor embodying the principles and concepts of the present invention and generally designated by the reference numeral 10 will be described.

FIG. 1 illustrates a prior art ice fishing apparatus 1 utilizing an elongate housing 2, with a fishing pole 3 mounting a reel structure 6 to direct a fishing line through the housing, with a tip-up signal member 5 selectively secured to the hook portion 4 to release the signal flag upon a fish strike, in a manner as set forth in U.S. Pat. No. 4,662,099.

More specifically, the ice fishing captor 10 of the instant invention essentially comprises an extensible and retractable coaxially aligned cylindrical body 13, wherein the cylindrical body is of a generally flexible construction defined by a helical reinforcing wire 14 mounted to define a support structure for transparent flexible covering sheet 15 formed about and coextensive with the helical wire 14. The elongate cylindrical body 13 is formed for positioning through an elongate opening 11 of an ice sheet 12 for use in an ice fishing procedure to provide access to underlying fishing waters. A rigid annular ring 16 is mounted coaxially to an upper terminal end of the body 13, and includes a ring central opening 17 and is coaxially aligned with the body 13. The ring 16 includes a plurality of diametrically aligned handles 18 mounted on opposed sides of the ring, wherein each of the handles are of a generally "U" shaped configuration and further defines an "U" shaped recess 19 medially of each of the handles, wherein the recesses 19 are aligned relative to one another in spaced parallel planes to receive a fishing pole within each of the aligned recesses 19 of a type for example as set forth in FIG. 1. The cylindrical body 13 further includes a rigid cylindrical base 20 of a generally tubular construction mounted coaxially to a lower terminal end of the body 13, with a bottom flared edge 20a directed outwardly therefrom to enhance a free-standing support of the organization during storage thereof. The flared edge 20a also provides a smooth surface for fishing line so it will not rub on sharp ice and cut the line.

A trap door member 21 is mounted adjacent the lower terminal end of the cylindrical base and the flared edge 20a, wherein the trap door member 21 provides selective closure of the lower opening defined by the cylindrical base 20. The trap door member 21 includes a trap door pivot axle 22 orthogonally oriented relative to an axis defined by the cylindrical base 20 mounted to a rear terminal edge of the trap door 21 to permit pivotment of the trap door 21 relative to the cylindrical base. Spaced abutment flanges 23 are mounted interiorly of the cylindrical base 20 at a diametrically opposed portion of the cylindrical base relative to the pivot axle 22. The spaced abutment flanges 23 define a gap therebetween and prevent positioning of the trap door 21 in a normal or first configuration with the trap door forward edge 25 overlying the flanges 23. A slot 24 is diametrically directed interiorly of the trap door member 21 orthogonally oriented relative to the trap door forward edge 25. The slot 24 further is of a keyhole configuration for ease of directing and positioning of fishing lines and the like therethrough. In use upon pulling of a fish through the trap door, the trap pivots upwardly in a manner as illustrated in FIG. 3 for example, and upon directing of a fish therethrough returns to the first position, as illustrated in solid lines from the second position, as illustrated in phantom in FIG. 3.

FIGS. 9 and 10 illustrate the use of spaced storage containers 26, each diametrically aligned relative to one another and each offset 90 degrees relative to each handle 18 to provide balancing of the containers during transport and positioning of the apparatus through the opening 11 of the ice sheet 12. The containers are provided for storage of tackle and various components during an ice fishing procedure, and each include a lid 27, a hinge 28 to pivotally mount the lid to the container and a lid handle 29 for lifting of each lid for access interiorly of the container.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ice fishing apparatus for positioning through an elongate opening within an ice sheet, wherein the apparatus comprises,
   an elongate cylindrical body, the cylindrical body including an upper terminal end and a lower terminal end, wherein the cylindrical body is coaxially aligned and wherein a rigid annular ring is fixedly mounted coaxially to the upper terminal end, and
   a rigid cylindrical tubular base is coaxially and integrally mounted to the lower terminal end, and
   trap means mounted within the cylindrical base for securement of a fish directed through the cylindrical base when the cylindrical body is positioned within the elongate opening, and
   wherein the cylindrical body includes an elongate reinforcing helical wire coaxially directed through the cylindrical body coaxially aligned about the cylindrical body, and a flexible covering sheet fixedly mounted to the helical wire, wherein the helical wire is flexible and permits extension and retraction of the cylindrical body to accommodate the elongate opening, and
   wherein the covering sheet is transparent, and
   wherein the cylindrical base is rigid and wherein the trap means includes a trap door member, the trap door member mounted adjacent a cylindrical base lower terminal end, and the cylindrical base lower terminal end flared outwardly to provide an enhanced support for apparatus during storage.

2. An apparatus as set forth in claim 1 wherein the trap door member includes a pivot axle mounted to a rear terminal edge of the trap door, with the pivot axle mounted through the cylindrical base, and the trap door including a forward terminal edge spaced from and parallel to the rear terminal edge, the forward terminal edge including an elongate slot diametrically aligned with the trap door relative to the cylindrical base.

3. An apparatus as set forth in claim 2 wherein the slot is of a generally keyhole configuration to accommodate fishing tackle directed therethrough.

4. An apparatus as set forth in claim 3 wherein the cylindrical base includes a plurality of spaced abutment flanges to provide spaced abutment surfaces for the trap door to underlie the forward terminal edge of the trap door in a first raised position when directing of a fish therethrough.

5. An apparatus as set forth in claim 4 wherein the annular ring includes a plurality of spaced handles, the handles mounted on the annular ring diametrically opposed relative to one another and positioned in spaced parallel planes, and each handle including a "U" shaped recess, wherein each "U" shaped recess is aligned relative to one another and positioned within a respective spaced parallel plane of the spaced parallel planes.

6. An apparatus as set forth in claim 5 including a plurality of storage containers diametrically aligned relative to one another and fixedly mounted on the rigid annular ring to overlie the rigid annular ring and extend beyond the perimeter of the rigid annular ring to enhance positioning of the ring in the elongate opening and prevent directing of the ring through the elongate opening when the apparatus is positioned within the elongate opening.

* * * * *